United States Patent [19]

Biafore

[11] Patent Number: 4,596,177
[45] Date of Patent: Jun. 24, 1986

[54] ACTUATOR SYSTEM

[75] Inventor: Louis P. Biafore, Columbus, Ohio

[73] Assignee: Rockwell International Corporation, El Segundo, Calif.

[21] Appl. No.: 441,309

[22] Filed: Nov. 12, 1982

Related U.S. Application Data

[63] Continuation of Ser. No. 183,598, Sep. 2, 1980, abandoned.

[51] Int. Cl.$^4$ ............................................. F15B 21/02
[52] U.S. Cl. .................................. 91/35; 91/363 A; 91/367; 91/509
[58] Field of Search ............... 91/37, 35, 362, 363 R, 91/363 A, 517, 518, 532, 509, 510, 361, 367, 380

[56] References Cited

U.S. PATENT DOCUMENTS

| | | | |
|---|---|---|---|
| 3,033,219 | 5/1962 | Erle | 91/515 |
| 3,216,325 | 11/1965 | Couffer, Jr. | 91/37 |
| 3,224,463 | 12/1965 | Jensen | 91/37 |
| 3,496,836 | 2/1970 | Jenney | 91/517 |
| 3,561,322 | 2/1971 | Gerstine | 91/363 A |
| 3,679,156 | 7/1972 | Redmond, Jr. | 91/510 |
| 3,741,073 | 6/1973 | Garnjost | 91/509 |
| 3,850,081 | 11/1974 | Joelson | 91/517 |
| 3,887,028 | 6/1975 | Goff | 91/510 |
| 3,928,968 | 12/1975 | Becker | 91/509 |
| 3,972,246 | 8/1976 | Link | 91/37 |
| 4,112,824 | 9/1978 | Krause | 91/448 |
| 4,120,234 | 10/1978 | Joelson | 91/518 |
| 4,155,288 | 5/1979 | Glaze | 91/363 A |
| 4,235,156 | 11/1980 | Olsen | 91/467 |
| 4,436,018 | 3/1984 | Murphy | 91/509 |

Primary Examiner—Abraham Hershkovitz
Attorney, Agent, or Firm—Charles T. Silberberg

[57] ABSTRACT

A hydraulic fluid powered actuation system preferably for controlling the position of a control surface of an aircraft in response to a plurality of redundant control signals is disclosed. The system comprises an actuator adapted to be mounted in the aircraft, comprising a housing having first and second cylinders with a piston moveably mounted within each of the cylinders. A piston rod connects the pistons and is adapted to engage the control surface. Two rotary torque motors having a common drive shaft are provided which are adapted to receive the plurality of redundant controls signals. First and second rotary control valves, coupled to the drive shaft, and thus, adapted to be driven by the rotary torque motors, are used to control the emission and exhaust of hydraulic fluid from the first and second cylinders, respectively. Preferably, there are four control signals and the torque motors are DC, multiple-poled torque motors with each coil on each torque motor coupled to a different control signal.

13 Claims, 4 Drawing Figures

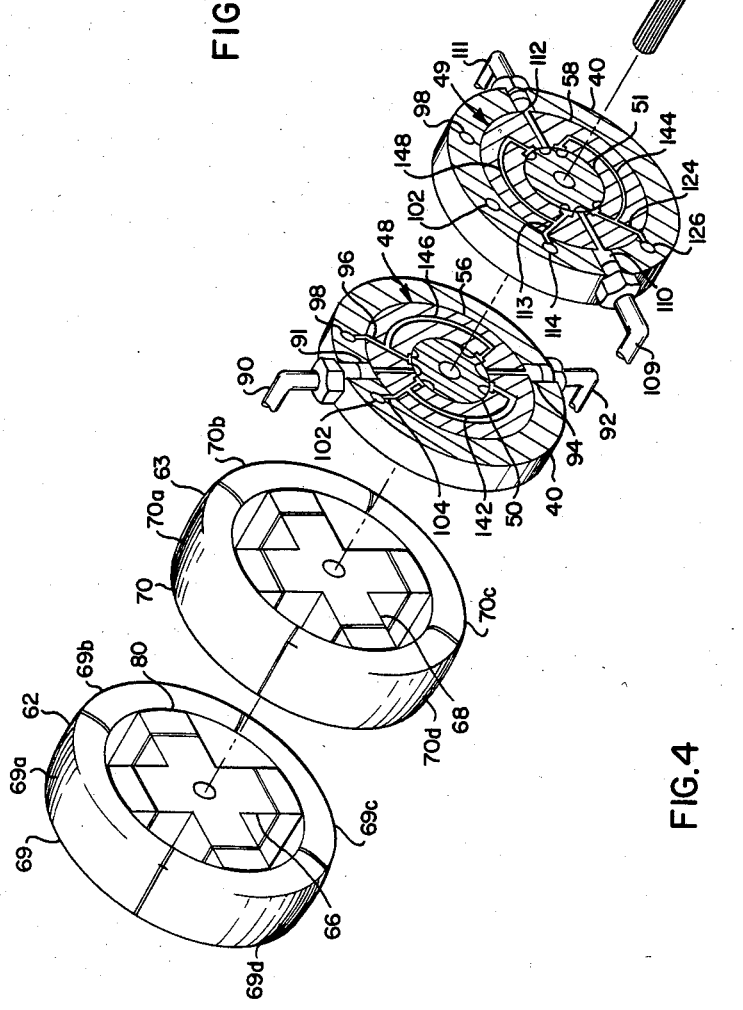

ACTUATOR SYSTEM

This is a continuation of application Ser. No. 183,598, filed Sept. 2, 1980, now abandoned.

FIELD OF INVENTION

The invention generally relates to the field of hydraulic actuator systems, and more particularly, to a direct drive actuator system preferably for control of flight control surfaces of an aircraft.

BACKGROUND OF INVENTION

Typical control systems for aircraft flight control surfaces use redundant hydraulic actuators to achieve the necessary reliability. Redundancy, is obtained by either using a plurality of actuators or coupling hydraulic cylinders in tanden with a common piston rod. Most prior methods use one or more hydraulically actuated linear spool type servo valves to control the flow of hydraulic fluid to the actuator. Thus, when the pilot of the aircraft moves the appropriate control in the flight station, a valve coupled to the control by the mechanical linkage is opened and hydraulic fluid, via a line coupled to the servol valve drives the spool, allowing a second source of hydraulic fluid to flow to the actuator. Such systems are heavy because of the necessity of having hydraulic lines running to the plurality of servo valves as well as hydraulic lines for driving the actuators.

In the so-called "fly-by-wire systems", when the pilot moves the controls, an electric signal is generated which actuates electrical/hydraulic valves mounted in proximity to the primary servo valves. Obviously, such a system is lighter in weight since the mechanical linkage system to the flight station is eliminated. Typical systems using this approach are disclosed in U.S. Pat. Nos. 3,338,138, Redundant Control System by Wood, and 3,543,641 Control for Spoilers And Like Aerodynamic Actuators of Aircraft by H. Deplante, et. al. The disadvantage of such systems is that to obtain the required reliability, the systems become very complex, large in size, and expensive to manufacture and maintain. For example, the U.S. Air Force F-16 aircraft requires three electrical mechanical actuators driving three separate linear spool type servo valves, with three monitoring valves and mechanical feedback linkage, which in turn control a single tandem actuator. The space shuttle is even more complex in that it uses a quad-redundant system.

With the advent of highly reliable electronic systems, and in particular the development of digital electronic components and circuits, along with advanced magnetic materials, it has become possible to use what is commonly called "direct drive systems". In such systems, the servo valves used to control the actuators are directly coupled to electromechanical drivers; for example, permanent magnet touque motors. An example of this type of system can be found in U.S. Pat. No. 2,826,896, Manually Controlled Electro-hydraulic System For Aircraft by S. G. Glaze, et. al. Glaze uses two hydraulic cylinders in tandem coupled by a common output shaft. The two servo valves are coupled to each cylinder and a torque motor is coupled to the ends of the spools by means of a mechanical linkage system. This system has several drawbacks. Because the spools are not mechanically coupled to each other, each torque motor has to be sized sufficiently large so as to have the capability to break up any particles that might become lodged in the spool valves causing them to jam up. The lack of mechanical coupling requires that four servo valves must be used in order to achive the reliability of a quad-redundant system (such as used on the shuttle).

Furthermore, due to the use of tolerance prone mechanical linkage between the torque motor and the spool, adjusting the null point of the spool is difficult to achieve. This could create a major problem if line-to-line type spool valves are used. Additionally, permanent magnet torque motors as disclosed by Glaze et al. are limited in output by iron saturation at the pole face; and thus, if high output force is required, the torque motor becomes quite large and creates significant packaging and weight problems. Another problem with this type of torque motor is that there is no practical way of adjusting the mechanical null point and thus, the adjustment must be made by mechanisms in the servo valve.

Other attempts at direct drive use such devices as voice coils to drive the spool. But use of voice coils requires a rather complex mechanical linkage system between the linear spool valve and coil, and thus difficulties are also experienced in establishing the null point for the spool. This is particularly a problem in dual type system where dual spools and dual voice coils are used.

Therefore, it is a primary object of this invention to proivde a simplified, lightweight, direct drive actuator system.

A further object of this invention is to provide a direct drive actuation system for controlling a control surface of an aircraft that can achieve reliability equal to conventional quad-redundant actuators.

A still further object of this invention is to provide a direct drive actuation system for controlling a control surface of an aircraft that integrates the servo valves and the servo valve drive mechanisms into the body of the actuator.

SUMMARY OF THE INVENTION

The invention is a hydraulic fluid powered actuation system preferably for controlling the position of a control surface of an aircraft in response to a plurality of redundant control signals. The system comprises an actuator adapted to be mounted in the aircraft. The actuator preferably comprises a housing having first and second cylinders with a piston moveably mounted within each of the cylinders. A piston rod connects the two pistons and is adapted to engage the control surface. Two rotary torque motors having a common drive shaft are provided which are adapted to receive the plurality of redundant electrical control signals. First and second rotary hydraulic servo valves are coupled directly to the drive shaft and thus are driven by the torque motors and are adapted to control the admission and exhaust of hydraulic fluid from the first and second cylinders, respectively.

Preferably, there are four control signals and the torque motors are four pole, brushless DC torque motors with each coil thereon coupled to a different control signal. To achieve compactness, the torque motors and servo valves are mounted within the housing aligned with the cylinders.

The novel features which are believed to be characteristic of the invention, both as to its organization and its method of operation, together with further objects and advantages thereof, will be better understood from the following description in connection with the accompanying drawings in which a presently preferred embodiment of the inventon is illustrated by way of example. It is to be expressly understood, however, that the drawings are for purposes of illustration and description only, and are not intended as a definition of the limits of the invention.

BRIEF DESCRIPTION OF THE DRAWINGS

FIG. 3 is an exploded perspective view of a pair of torque motors coupled by a shaft to a pair of rotary servo valves.

FIG. 4 is a schematic diagram of an electronic control system for the actuator illustrated in FIG. 1.

DESCRIPTION OF PREFERRED EMBODIMENT

Figure 1:
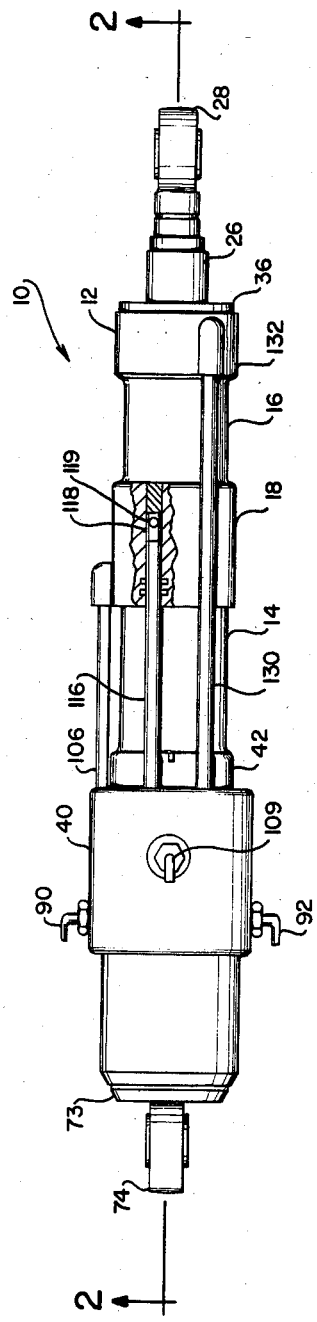
FIG. 1 is a side elevation view of a tandem hydraulic actuator.
Figure 2:
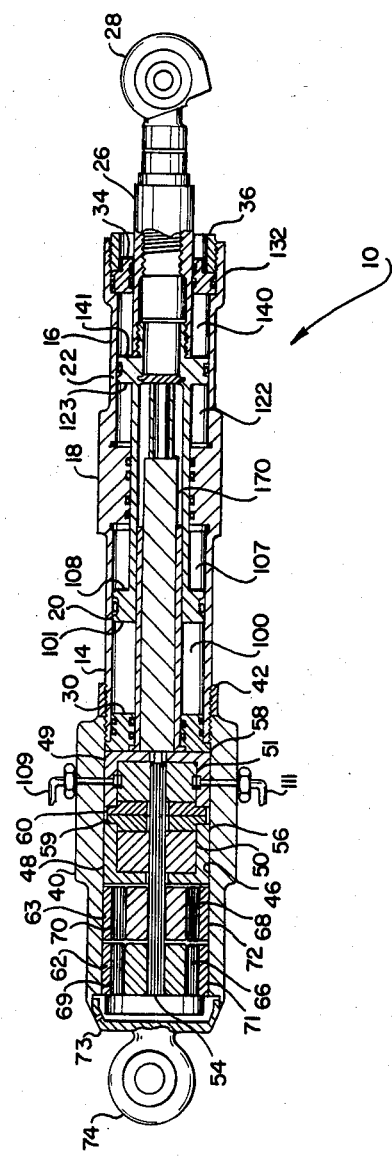
FIG. 2 is a cross-sectional view of the actuator illustrated in FIG. 1 along the lines 2—2.

Illustrated in FIG. 1 is a side elevation view of a tandem hydraulic actuator generally designated by numeral 10. Illustrated in FIG. 2 is a cross sectional view of the actuator 10 shown in FIG. 1, along the Lines 2—2. Referring to FIG. 1 and FIG. 2, it can be seen that the actuator 10 comprises a body 12 divided into two cylinders, 14 and 16, coupled to either side of piston rod guide 18. Pistons 20 and 22 are moveably mounted within cylinders 14 and 16, respectively, and are coupled together by a piston rod 26. Piston rod 26 terminates in a rod end bearing 28, suitable for coupling to a control surface of an aircraft. The stroke of piston 20 is limited by sealing member 30 and piston rod guide 18. The stroke of piston 22 is, of course, identical to piston 20 and is determined by guide 18 and sealing member 34, which is locked in place by threaded retainer 36. The body 12 threadably engages housing 40 and is locked in place by locknut 42. While a tandem linear actuator is shown for purposes of illustration a rotary actuator (not shown) could also be used.

Mounted within bore 46 of housing 40 are two rotary servo valves 48 and 49. The servo valves 48 and 49 comprise spools 50 and 51 which are rotatably mounted in housing 56 and 58 respectively, and locked therein by covers 59 and 60. The spools 50 and 51 are coupled to a common splined drive shaft 54. Also mounted within bore 46 of housing 40 are two rotary torque motors 62 and 63 having rotors 66 and 68, respectively, also coupled to shaft 54. The torque motors are preferably 4 pole DC troque motors. The coils 69 and 70 of torque motors 62 and 63 are mounted within retainers 71 and 72, respectively. The bore 46 is sealed by means of a threaded retainer 73, which incorporates a rod-end bearing 74 for coupling to aircraft structure (not shown). The particular arrangement illustrated is not a necessity, for example the torque motors and servo valves could be staggered.

A mechanical stop (not shown) is incorporated to limit the rotation of the spools to the amount necessary to open the ports. Furthermore, centering means (not shown) to center the torque motors are provided. The centering means can be in the form of a spring or an electrical control circuit adapted to sense the angular position of the rotor and provide a feedback signal to the computer to electronically adjust the position of the torque motors.

Illustrated in FIG. 3 is an exploded perspective view of the two servo valves 48 and 49, cross sectioned to show interior portions and the two 4 pole DC torque motors, 62 and 63. Still referring to FIG. 1 and FIG. 2, and additionally to FIG. 3, it can be seen that coils 69 and 70 of torque motors 62 and 63 generally are divided into four separate quandrants. Coil 69 comprised coil quadrants 69a, 69b, 69c, and 69d; while coil 70 comprised coil sections 70a, 70b, 70c, and 70d. Thus, in this case, four distinct input signals can be applied to each torque motor. Since there are four coils each rotor has four poles. Each pole comprises a permanenet magnet denoted by numeral 80 attached to the rotors 66 and 68. Brushless DC torque motors are preferred because they are simple, smooth acting, linear and frictionless and provides high torque to weight ratios.

Pressurized hydraulic fluid from line 90 is coupled to the servo valve 48 via port 91 and exhausted therefrom to line 92 via port 94. Port 98 in housing 56 of servo valve 48 is coupled to passageway 96 in housing 40, which in turn couples to portion 100 of the cylinder (on side 101 of piston 20). Port 102 in housing 40 is coupled to passageway 104 in housng 56. An external tube 106 connects passageway 104 to a passageway (not shown) in guide 18 which couples to portion 107 of the cylinder 14 (on side 108 of piston 20). Pressurized hydraulic fluid from line 109 is coupled to the servo valve 49 via port 110 and exhausted therefrom to line 111 via port 112. Port 114 in housing 40 is coupled to passageway 113 in housing 58. An external tube 116 couples the passageway 113 to passageway 118 in guide 132. Passageway 118 in turn couples to portion 122 of cylinder 16 (on side 123 of piston 22) via passageway 119. Port 126 in housing 40 is coupled to passageway 124 in housing 58. An external tube 130 couples passageway 126 to passageways (not shown) in end 132 to portion 140 of cylinder 16 (on side 141 of piston 22).

Thus, if spools 50 and 51 are rotated clockwise flow paths between port 94 and port 102 via passageway 142 and between port 112 and port 126 via passageway 144 are opened. Simultaneously flow paths will also be opened from port 91 to port 98 and from port 110 to port 114. This will allow portions 100 and 122 of of cylinders 14 and 16, respectively to be pressurized while portions 107 and 140 to be exhausted causing piston rod 26 to be extended. If the spools 50 and 51 are rotated counter clockwise flow paths between port 94 and port 98 will be opened via passageway 146 and between port 111 and port 114 via passageway 148. Simultaneously flow paths will be opened between port 91 and port 102 and between port 110 and port 126. This, of course, will allow portions 107 and 140 of cylinders 14 and 16, respectively, to be pressurized while portions 100 and 122 to be exhausted causing piston rod 26 to retract.

Illustrated in FIG. 4 is a schematic representation of an electronic control system for the actuator 10. Aircraft sensor inputs (such as aircraft angle of attack, turn rate, etc.) designated by numeral 150 and pilot input control signals 152 are coupled to a computer 154. The output of the computer are fed to amplifiers 156a, 156b, 156c, and 156d, which in turn provide the output signals to the torque motors. For proper reliability the output signal from each amplifier is fed to one coil of each torque motor. The actuator 10 is mounted between aircraft structure 160 via rod end bearing 74 and to control surface 162 via rod end bearing 28 on piston rod 26. Feedback signals proportional to the control surface 162 position are fed back to the computer. Referring to FIG. 2, in particular, these redundant feedback signals can be provided by a pair of position indicators within the actuator 10, generally indicated by numeral 170.

Because of the use of the unique combination of redundant cylinders, rotary servo valves and brushless DC torque motors, the fact that the torque motors and servo valves are all mounted on a common shaft and four control signals are provided with each torque motor coupled to each signal the overall reliability is substantially better than existing non-direct drive quad redundant systems due to a reduction in parts. However, it should be noted that in some applications less than four control signals can be used.

Another advantage of this combination is that if the diameter of the rotors are made larger than the diameters of the spools, a mechanical advantage is obtained increasing the ability to breakup particles that may become lodged in the servo valves.

While the actuation system has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

Therefore, what is claimed is:

1. A hydraulic fluid powered actuation system comprising: an actuator, said actuator comprising:
   a housing having first and second cylinders;
   a piston moveably mounted within each of said cylinders;
   a piston rod connected to said pistons for transmitting a force to an article;
   a drive shaft;
   two rotary torque motors responsive to a plurality of concurrent redundant control signals, said motors being directly coupled to said drive shaft for selective intermittent rotation of said drive shaft, said motors rotating in unison with said drive shaft;
   first and second rotary control valves for controlling the position of said pistons within said cylinders by admission and exhaust of said fluid to said cylinders, said valves being directly coupled to said drive shaft for rotation in unison therewith, such that rotation of said drive shaft by said motors in response to said control signals rotates said valves, said valves similtaneously varying substantially identically the admission and exaust of fluid to said cylinders by virtue of their rotation, whereby the positions of said pistons are changed and a force transmitted to said article.

2. The system of claim 1 wherein said first valve controls admission and exhaust of said fluid to said first cylinder, and said second valve controls admission and exhaust of said fluid to said second cylinder.

3. The system of claim 2 wherein said valves control admission and exhaust of said fluid to said cylinders on both sides of said pistons.

4. The system of claim 1 wherein said motors each have a rotor, a plurality of poles connected to said rotor, and a plurality of coils equal in number to said poles, said coils for each motor being positioned circumferentially around said poles, each of said coils for each motor being coupled to a different one of said redundant control signals, whereby redundant control of said motors is provided.

5. The system of claim 4 wherein admission and exhaust of said fluid to said cylinders is controlled by said valves such that net pressure on said pistons is substantially identical, whereby redundant control to said piston rod is provided.

6. The system of claim 5 wherein said valves are spool valves having cylindrical spools, said rotors are cylindrical, said rotors rotate with said shaft, the diameter of each of said rotors being greater than the diameter of each of said spools such that reliability of said valves is enhanced by increased ability of said valves to breakup and clear particles which may be entrapped therein.

7. The system of claim 5 also including a control means for selectively transmitting said signals to said motors.

8. The system of claim 7 wherein said motors, valves, and cylinders are in axial alignment.

9. The system of claim 8 wherein said control means is responsive to a plurality of parameters, one of said parameters being position of said pistons.

10. The system of claim 8 wherein said actuation system is for controlling the position of the control surface of an aircraft, said piston rod is connected to said control surface such that movement of said pistons causes a movement of said control surface, and said control means is responsive to aircraft flight parameters.

11. The system of claim 10 wherein said control means is also responsive to position of said pistons.

12. A hydraulic fluid powered actuation system comprising:
   an actuator, said actuator comprising:
   a housing having first and second cylinders;
   a piston moveably mounted within each of said cylinders;
   a piston rod connected to said pistons for transmitting a force to an article;
   a drive shaft;
   a rotary torque motor responsive to a plurality of concurrent redundant control signals, said motor being coupled to said drive shaft for selective intermittent rotation of said drive shaft, said motor rotating in unison with said drive shaft, said motor having a rotor, a plurality of poles connected to said rotor, and a plurality of coils equal in number to said poles, said coils being positioned circumferentially around said poles, each of said coils being coupled to a different one of said redundant control signals, whereby redundant control of said motor is provided;
   first and second rotary control valves for controlling the position of said pistons within said cylinders, said first valve controlling admission and exhaust of said fluid to said first cylinder, and said second valve controlling admission and exhaust of said fluid to said second cylinder, said valves being coupled to said drive shaft for rotation in unison therewith, such that rotation of said drive shaft by said motor in response to said control signals rotates said valves, said valves simultaneously varying substantially identically the admission and exhaust of fluid to said cylinders by virtue of their rotation, whereby the positions of said pistons are changed and a force transmitted to said article.

13. The system of claim 12 wherein said motor, valves, and cylinders are in axial alignment.

* * * * *